Patented July 11, 1939

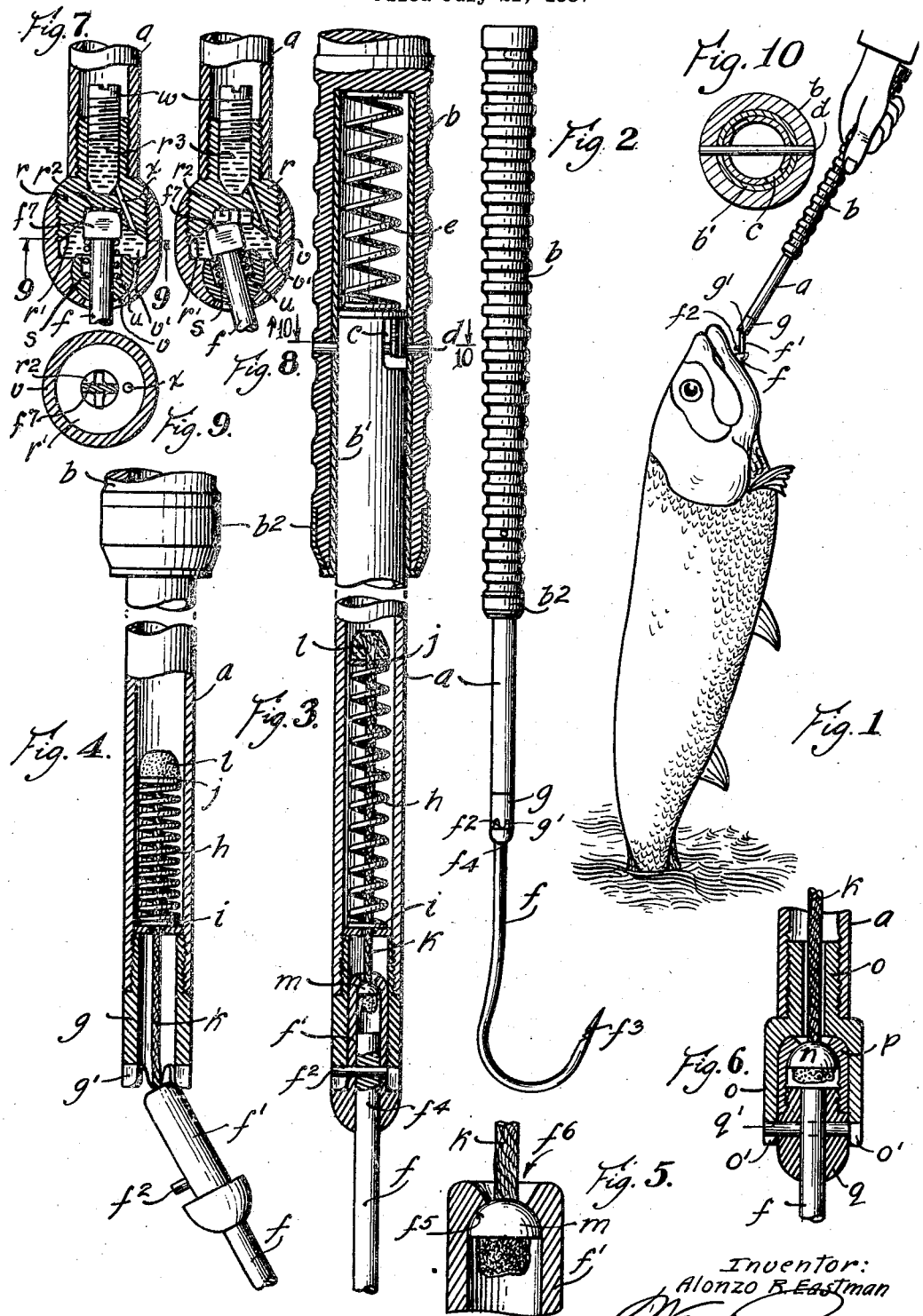

2,165,245

UNITED STATES PATENT OFFICE 2,165,245

GAFF HOOK

Alonzo R. Eastman, Portland, Oreg.

Application July 21, 1937, Serial No. 154,774

14 Claims. (Cl. 43—5)

The principal object of my invention is to provide a gaff hook for landing fish, which gaff hook normally is stiff and more or less rigid, but is adapted to permit the parts thereof to become detached to a limited degree to provide swiveling action between the hook and the shank and also articulation therewith.

In landing a fish, particularly large game fish such as salmon, it is necessary to use a gaff hook, and because of the gameness of the fish, it tends to throw itself free from the hook. Many fish are lost after they have been gaffed and before they are landed. A fish can wriggle free because it can lift itself free of a gaff hook which is more or less rigid. If the hook is arranged upon a swiveling action, the swiveling tends to accommodate the movement of the fish about an axis of rotation extending longitudinally of the handle, and if the hook is connected to the handle by a flexible member, it is relatively difficult for a fish to free itself. An articulated or journaled handle, however, prevents the gaff from having that degree of lateral stiffness by which a gaff hook can be embedded in a fish when the parts are extended laterally.

I have provided a gaff hook which is normally stiff and unyielding but which is adapted to elongate under the weight of a fish, so that the gaff hook portion can become detached from the shaft. The parts are connected by a flexible element such as a cable and thus when the elongated portions become detached they are secured together merely by the flexible cable, and articulation as well as swiveling action is accommodated.

Further details of my invention and the mode of construction and operation are hereinafter described with reference to the accompanying drawing, in which:

Fig. 1 is a more or less pictorial illustration of the manner in which a fish is landed with a gaff hook embodying my invention;

Fig. 2 is a longitudinal elevation of said gaff hook;

Fig. 3 is a larger scaled longitudinal section thru a portion of said gaff hook and illustrates the manner in which the parts are normally joined together;

Fig. 4 is an elevation of said parts illustrating the manner in which the hook may become detached from the socket formed by the tubular portion of the handle and permit swiveling and articulation to take place;

Fig. 5 is a larger scaled detail view showing the manner by which a flexible cable is provided with a rounded connection to eliminate sharp rupturing bends;

Fig. 6 is a view similar to Fig. 5 showing a modification in the manner by which the flexible cable may be secured without being subject to sharp bending stresses;

Fig. 7 is a similar large scaled detail showing a still further modification of a joint permitting articulation at the point where the hook joins the handle, said figure showing the parts seated one within the other;

Fig. 8 is a view similar to Fig. 7 but with the parts disengaged to permit articulation;

Fig. 9 is a sectional view taken on the line 9—9 in Fig. 7, illustrating the manner in which the parts are seated one within the other; and Fig. 10 is a sectional view taken on the line 10—10 in Fig. 3.

A gaff hook embodying my invention comprises a handle $a$, preferably made of tubular metal and to which a wooden stock $b$ is detachably secured. The fastening devices preferably comprise a pair of bayonet joint slots $c$ formed at the end of the handle $a$, and a pin $d$ extending transversely of the stock is adapted to engage said bayonet joint slots. A coil spring $e$ is housed within the stock and bears against the end of the handle to hold said pin in engagement with said bayonet joint slot.

A liner $b'$ is preferably arranged within the bore of the stock and has a free fit with the periphery of the handle. A ferrule $b2$ encircles the end of the stock to prevent said stock from splitting. At the end of said handle opposite the stock a gaff hook $f$ is journaled. Said gaff hook is provided with a shank $f'$, which is journaled within a removable bit $g$ constituting an extension of said handle. Said bit is threaded thru said handle and forms a longitudinal extension thereof. Said bit is detachable from the handle to permit a coiled spring $h$ to be housed within the handle and a washer $i$ to bear against the end of the bit, against which one end of the coiled spring can bear. Another washer $j$ is arranged at the opposite end of said coiled spring and said coiled spring is compressed between said washers.

A section of flexible material such for example as steel cable $k$ extends thru the coils of said spring $h$ and terminates in the knob-like end $l$ at one end extending above the washer $j$ and in a semi-spherical knob-like end $m$ housed within the bore of the shank $f'$ of the gaff hook. The cable is of sufficient length with regard to the parts of the gaff hook and the coiled spring h when elongated to cause the shank to be seated tightly within the bore of the bit g.

The end of said bit is provided with a series of notches or pockets g', and the shank is provided with a projecting pin f2 adapted to seat in a pocket with which it is aligned. When said pin is arranged in a pocket, the parts are prevented from swiveling; that is, rotating relatively about an axis extending longitudinally of the handle. The spring has sufficient initial tension that it takes a substantial pull upon the gaff hook to unseat said pin from one of said pockets, and thus said parts are permitted to swivel only when the barbed end f3 of the gaff hook is embedded in a fish.

The shank f' is hollow bored and adapted to receive a gaff hook f. The stem f4 of the gaff hook is held in the shank by the pin f2 which extends thru the shank and thru the stem of the gaff hook, as is illustrated in Fig. 3. The semi-spherical end m for the cable k seats in a cupped recess f5 formed at the end of the bore of said shank as illustrated in Fig. 5. The axial bore f6 leading exteriorly therefrom is sufficiently large to pass the cable but to retain the end m. Said bore is substantially larger than the cable, however, and permits a rather wide arcuate swing of the semi-spherical end m in its seat and the corresponding arcuate movement of the cable in the bore f6 without producing binding or a sharp bend in the cable at this point.

The shank f' is of substantial length and is seated substantially in its entirety in the bore of the bit g. A close sliding fit is thus produced at this point and thus if a fish is lifted as is shown in Fig. 1, said parts tend to bind one with the other and tend to prevent the gaff hook from slipping outwardly from the handle to the position shown in Fig. 4. When a fish is lifted directly upwardly, that is in line with the handle, the weight of the fish tends to compress the spring and permit the shank to become unseated from the bore of the handle so that the parts are free to move angularly as well as to rotate about the longitudinal axis thereof. The degree to which said parts thus overlie each other and their journaled fit in each other is a matter of some substantial importance, in my opinion. Another factor bearing upon the question is that when the barbed point f3 alone is entering in the fish, it extends at a substantial angle to the longitudinal axis of the handle and thus produces a binding strain to prevent said parts from sliding freely, but when the fish is embedded so that the embedded portion lies within the hook, it lies more nearly in a straight line with the shank, compresses the spring more easily, and permits the parts to slide outwardly.

In Fig. 6 I illustrate how a larger semi-spherical terminal n can be secured to the cable k. A bit o is screw-threaded into the handle a. Said bit is substantially larger than said handle and thus is adapted to accommodate an enlarged shank end p for the gaff hook f. A plug q seats within said shank end and is screw threaded therein. A pin q' extends across said plug and seats in a series of notches or sockets o' in the threaded portion of said bit and to this end function as do the similar structures shown in the first embodiment of my invention. The larger diameter of the shank end permits a larger semi-spherical end n to be provided and the outwardly belled bit o encircles said shank end to prevent it from enlarging to permit said semi-spherical end to pull through the central aperture formed in said shank end.

In the modification shown in Figs. 7, 8 and 9, I illustrate how an articulated joint can be formed between the handle a and the gaff hook f. This is accomplished by seating a bit r within the bore of the handle a and forming the end f7 of said gaff hook to be noncircular in section. The under side of said bit, that is the face of said bit extending towards the gaff hook, is recessed as at r', and in the central portion a pocket r2 is formed. Said pocket is formed to receive the noncircular end f7 of the gaff hook under the influence of a coiled spring f, which encircles said hook. That is, said spring f normally tends to hold the end f7 of the gaff hook in the recess r', and the noncircular end f7 is aligned with the pocket to seat said end therein. When seated the noncircular end prevents relative rotation of the gaff hook. It also tends to cause said gaff hook to be rigidly aligned with the handle.

Said gaff hook is seated within a semi-spherical ball joint t, preferably made of rubber or other resilient material, and is seated in a socket q formed within a shank end v. Said shank end is screw-threaded to the bit r, and is hollowed out as is shown in Figs. 7 and 8. The bit r also is more or less tubular and is sealed at one end by a plug w. A chambered portion v' within the shank end communicates with the bore r3 of the bit by an oil hole x. The bore of said bit, the chambered portion of the shank f, and the oil hole form a reservoir for oil. Said oil thus surrounds the end of the shank hook, the coil spring, and a portion of the oil tends to work between the ball joint t and its socket q. The oil thus serves to lubricate said parts and to prevent them from locking together, rusting, or otherwise failing to function in an efficient manner. A fresh supply of oil can be provided by unscrewing the bit, removing the plug and filling the bore and chambered portion of the shank end.

In the absence of a pull upon the gaff hook in said modification, and when the noncircular end f7 of the gaff hook is properly aligned with the pocket r2 in the bit, the gaff hook and handle are locked together and form longitudinal extensions of each other. The gaff hook can thus be used to gaff a fish as if said parts were one integral member. The weight of the fish, however, is sufficient to compress the coil spring s and to move the noncircular portion f7 of said gaff hook into engagement with the pocket r2. The gaff hook then is free to move angularly as well as to rotate about its longitudinal axis in the ball joint t, as is illustrated in Fig. 8. When the fish is removed from the hooked portion of said gaff hook, the parts are then moved toward each other by the action of the coiled spring and the resiliency of the member t. Thus, when the gaff hook is aligned, the end f7 will again seat in the pocket r2 and the handle and gaff hook will be effectively secured one with the other. If the member t is provided with sufficient resiliency, it can effectively replace the coiled spring s.

I claim:

1. A device of the character described comprising a handle element and a hook carried thereby, said handle element being tubular, said hook being provided with a shank adapted to seat in the bore of said tubular handle element, and an elongated cable joining said hook and handle elements being of such length as to permit unseating of the hook shank.

2. A device of the character described comprising a handle element and a hook carried thereby, said handle element being tubular, said hook being provided with a shank adapted to seat in the bore of said tubular handle element, means adapted for mutual engagement to prevent relative axial rotation of said parts, and a spring element adapted to hold said hook and handle elements seated relatively.

3. A device of the character described comprising a handle element and a hook carried thereby, said handle element being tubular, said hook being provided with a shank adapted to seat in the bore of said tubular handle element, a pin-and-socket joint formed upon the engaging portion of said tubular handle and the shank of the hook to prevent relative axial rotation of said handle and hook element, and a spring element adapted to hold said hook and handle elements seated relatively.

4. A device of the character described comprising a handle element and a hook carried thereby, said handle element being tubular, said hook being provided with a shank adapted to seat in the bore of said tubular handle element, means adapted for mutual engagement to prevent relative axial rotation of said parts, an elongated flexible member joining said hook and handle elements and being of such length as will permit unseating of the hook shank, and a spring element adapted to hold said hook and handle elements seated relatively.

5. A device of the character described comprising a handle element and a hook carried thereby, said handle element being tubular, said hook being provided with a shank adapted to seat in the bore of said tubular handle element, means adapted for mutual engagement to prevent relative axial rotation of said parts, an elongated cable joining said hook and handle element and being of such length as will permit unseating of the hook shank, and a coiled spring element encircling said cable adapted to hold said hook and handle elements seated relatively.

6. A device of the character described comprising a handle element and a hook carried thereby, said handle element being provided with a separable stock held in engagement therewith, said handle element being tubular, said hook being provided with a shank adapted to seat in the bore of said tubular handle element, means to prevent relative axial rotation of said hook and handle element, an elongated flexible member joining said hook and handle element and being of such length as to permit an unseating of the hook shank, and a spring element adapted to hold said hook and handle element seated relatively to each other.

7. A device of the character described comprising a handle element and a hook carried thereby, said handle element being provided with a separable stock resiliently held in engagement therewith, said handle element being tubular, said hook being provided with a shank adapted to seat in the bore of said tubular handle element, means adapted to prevent relative axial rotation of said hook and handle element, an elongated flexible member joining said hook and handle element and being of such length as to permit unseating of the hook shank, and a spring element adapted to hold said hook and handle element seated relatively to each other.

8. A device of the character described comprising a handle element and a hook carried thereby, said hook being secured to the handle element by a rotatable and articulated joint, and yieldable means for holding said hook and handle rigid across said joint but yieldable in the presence of a predetermined pull upon said hook to render said joint movable.

9. A device of the character described comprising a handle element and a hook carried thereby, said hook being secured to the handle element by a rotatable and articulated joint, and spring-seated means for holding said hook and handle rigid across said joint but yieldable in the presence of a predetermined pull upon said hook to render said joint movable.

10. A device of the character described comprising a handle element and a hook carried thereby, said handle element and said hook being joined by an axially rotatable and flexible member.

11. A device of the character described comprising a handle element and a hook carried thereby, said handle element and said hook being joined by an axially rotatable and flexible member and in one position bearing one in the other to constitute a nonflexible joint.

12. A device of the character described comprising a handle element, a hook carried thereby, said handle element and said hook being joined by a flexible member and in one position bearing one in the other to constitute a nonflexible joint, and means tending to hold said handle element and said hook in bearing relation but to yield under a predetermined pull upon said hook.

13. A device of the character described comprising a handle element, a hook carried thereby, said handle element and said hook being joined by a flexible member and in one position bearing one in the other to constitute a nonflexible joint, and a resilient retaining device tending to hold said handle element and said hook in bearing relation but to yield under a predetermined pull upon said hook.

14. A device of the character described comprising a handle element, a hook carried thereby, said handle element and said hook being joined by a flexible member and in one position bearing one in the other to constitute a nonflexible joint, and a coiled spring tending to hold said handle element and said hook in bearing relation but to yield under a predetermined pull upon said hook.

ALONZO R. EASTMAN.